United States Patent
Linde et al.

(10) Patent No.: US 10,009,713 B2
(45) Date of Patent: *Jun. 26, 2018

(54) PROXIMITY AND TAP DETECTION USING A WIRELESS SYSTEM

(71) Applicant: Apple Inc., Cupertino, CA (US)

(72) Inventors: Joakim Linde, Palo Alto, CA (US);
Brian J. Tucker, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/697,500

(22) Filed: Sep. 7, 2017

(65) Prior Publication Data

US 2017/0366928 A1    Dec. 21, 2017

Related U.S. Application Data

(63) Continuation of application No. 15/200,392, filed on Jul. 1, 2016, now Pat. No. 9,769,598, which is a
(Continued)

(51) Int. Cl.
| | |
|---|---|
| *H04W 4/00* | (2018.01) |
| *H04W 4/021* | (2018.01) |
| *H04W 4/02* | (2018.01) |
| *H04B 17/318* | (2015.01) |
| *H04L 29/08* | (2006.01) |
| *H04W 4/80* | (2018.01) |
| *H04W 88/02* | (2009.01) |
| *H04W 88/08* | (2009.01) |

(52) U.S. Cl.
CPC .......... *H04W 4/008* (2013.01); *H04B 17/318* (2015.01); *H04L 67/06* (2013.01); *H04W 4/021* (2013.01); *H04W 4/023* (2013.01); *H04W 4/80* (2018.02); *H04W 88/02* (2013.01); *H04W 88/08* (2013.01)

(58) Field of Classification Search
CPC .......... H04B 17/00; H04B 3/46; H04L 43/00; H04L 43/50; H04W 24/00; H04W 4/008; H04W 4/021; H04W 4/023
USPC ........................................................ 370/252
See application file for complete search history.

(56) References Cited

U.S. PATENT DOCUMENTS

| | | | | |
|---|---|---|---|---|
| 4,670,906 A | * | 6/1987 | Thro | ...................... H04W 48/20 455/525 |
| 6,496,700 B1 | * | 12/2002 | Chawla | .................. H04W 16/18 455/435.2 |

(Continued)

*Primary Examiner* — Robert Lopata
(74) *Attorney, Agent, or Firm* — Meyertons, Hood, Kivlin, Kowert & Goetzel, P.C.

(57) ABSTRACT

A method for detecting the proximity of a signal source using wireless systems is contemplated in which a wireless mobile device wirelessly receives packets from a signal source and determines a received signal strength for each packet. The wireless mobile device may store information based upon the received signal strength for each packet, and calculate from the information stored for all the packets, a current path loss value corresponding to a current distance from the wireless mobile device to the signal source. The wireless mobile device may then determine whether the current distance is sufficient to be an enabling condition such as tap, for example, for a data transfer or a transaction between the wireless mobile device and the signal source.

20 Claims, 4 Drawing Sheets

Related U.S. Application Data continuation of application No. 14/867,439, filed on Sep. 28, 2015, now Pat. No. 9,386,402, which is a continuation of application No. 13/760,452, filed on Feb. 6, 2013, now Pat. No. 9,179,244.

(60) Provisional application No. 61/696,058, filed on Aug. 31, 2012.

(56) References Cited

U.S. PATENT DOCUMENTS

| | | | | |
|---|---|---|---|---|
| 7,058,018 | B1* | 6/2006 | Hasty, Jr. | H04L 45/00 370/250 |
| 7,257,383 | B2* | 8/2007 | Young | H03G 3/3078 330/129 |
| 7,385,945 | B1* | 6/2008 | Olson | H04W 72/005 370/328 |
| 7,466,660 | B2* | 12/2008 | Pani | H04W 84/12 370/252 |
| 7,509,131 | B2 | 3/2009 | Krumm et al. | |
| 7,548,517 | B2* | 6/2009 | Kyperountas | G01S 5/0289 342/453 |
| 7,613,829 | B2 | 11/2009 | Alve | |
| 8,086,248 | B2* | 12/2011 | Coronel | H04W 4/20 455/404.2 |
| 8,326,228 | B2 | 12/2012 | Lewis et al. | |
| 8,355,737 | B2* | 1/2013 | Macnaughtan | G01S 5/0252 455/456.1 |
| 8,559,379 | B2* | 10/2013 | Gainey | H04B 7/155 370/315 |
| 8,750,269 | B2* | 6/2014 | Lee, II | H04W 52/242 370/338 |
| 8,929,820 | B2* | 1/2015 | Elsom-Cook | G01S 3/20 340/539.13 |
| 9,258,713 | B2* | 2/2016 | Rangarajan | H04W 12/08 |
| 9,516,452 | B2* | 12/2016 | Bandyopadhyay | H04W 4/008 |
| 2004/0170132 | A1* | 9/2004 | Shin | H04W 52/10 370/294 |
| 2005/0227707 | A1* | 10/2005 | Law | H04W 64/00 455/456.1 |
| 2006/0182073 | A1* | 8/2006 | Pani | H04W 84/12 370/338 |
| 2006/0239202 | A1* | 10/2006 | Kyperountas | G01S 5/0289 370/252 |
| 2007/0027367 | A1 | 2/2007 | Oliver | |
| 2007/0079376 | A1* | 4/2007 | Robert | H04L 63/1408 726/23 |
| 2007/0211673 | A1* | 9/2007 | Anantha | H04M 3/42357 370/338 |
| 2008/0001735 | A1* | 1/2008 | Tran | G06F 19/3418 340/539.22 |
| 2008/0153507 | A1* | 6/2008 | Taaghol | H04W 64/00 455/456.1 |
| 2008/0195735 | A1 | 8/2008 | Hodges | |
| 2008/0273518 | A1* | 11/2008 | Pratt | G01D 21/00 370/345 |
| 2009/0042595 | A1* | 2/2009 | Yavuz | H04W 52/40 455/522 |
| 2009/0149171 | A1* | 6/2009 | Arpee | H04L 25/0214 455/423 |
| 2010/0135178 | A1* | 6/2010 | Aggarwal | G01S 5/0205 370/252 |
| 2011/0019562 | A1* | 1/2011 | Cattuto | G01S 5/0252 370/252 |
| 2011/0096760 | A1* | 4/2011 | Lee, II | H04W 52/242 370/338 |
| 2011/0098001 | A1* | 4/2011 | Elsom-cook | G01S 3/20 455/41.2 |
| 2011/0143767 | A1 | 6/2011 | Chen | |
| 2011/0159920 | A1 | 6/2011 | Lehmann | |
| 2012/0026993 | A1 | 2/2012 | Radpour | |
| 2012/0059622 | A1* | 3/2012 | Cacace | H05B 37/0272 702/150 |
| 2012/0063337 | A1* | 3/2012 | Shukla | H04W 28/22 370/252 |
| 2012/0077431 | A1 | 3/2012 | Fyke | |
| 2012/0119880 | A1* | 5/2012 | Ponnuswamy | G01S 5/00 340/8.1 |
| 2012/0281565 | A1* | 11/2012 | Sauer | H04W 64/00 370/252 |
| 2012/0295654 | A1 | 11/2012 | Sridhara | |
| 2012/0302263 | A1* | 11/2012 | Tinnakornsrisuphap | H04W 64/00 455/456.6 |
| 2013/0045741 | A1 | 2/2013 | Martin | |
| 2013/0051255 | A1* | 2/2013 | Estevez | H04W 64/00 370/252 |
| 2013/0052985 | A1* | 2/2013 | Tujkovic | H04W 4/22 455/404.2 |
| 2013/0093628 | A1* | 4/2013 | Jones | G01S 5/14 342/451 |
| 2013/0130714 | A1 | 5/2013 | Huibers | |
| 2013/0229928 | A1 | 9/2013 | Lipman | |
| 2013/0254284 | A1 | 9/2013 | Dougherty | |
| 2013/0260782 | A1* | 10/2013 | Un | H04W 64/00 455/456.1 |
| 2013/0278464 | A1* | 10/2013 | Xia | H01Q 3/36 342/430 |
| 2013/0301497 | A1 | 11/2013 | Gonikberg | |
| 2013/0303160 | A1* | 11/2013 | Fong | H04W 76/048 455/426.1 |
| 2013/0317944 | A1 | 11/2013 | Huang | |
| 2014/0168392 | A1 | 6/2014 | Kang | |
| 2014/0282877 | A1 | 9/2014 | Mahaffey | |

\* cited by examiner

PROXIMITY AND TAP DETECTION USING A WIRELESS SYSTEM

PRIORITY CLAIM

This application is a continuation of U.S. patent application Ser. No. 15/200,392, filed Jul. 1, 2016, which is a continuation of U.S. patent application Ser. No. 14/867,439, filed Sep. 28, 2015, which is a continuation of U.S. patent application Ser. No. 13/760,452, filed Feb. 6, 2013, now U.S. Pat. No. 9,179,244, issued Nov. 3, 2015, which claims priority to U.S. Provisional Patent Application Ser. No. 61/696,058, filed Aug. 31, 2012, which are herein incorporated by reference in their entirety.

BACKGROUND

Technical Field

This disclosure relates to wireless communication devices, and more particularly to a wireless mobile device detecting proximity to another wireless device using wireless signals.

Description of the Related Art

The use of wireless communication systems has rapidly evolved from predominantly voice-only communications to the transmission of data, such as Internet and multimedia content.

Recently, there has been a trend for wireless devices to be able to transfer data to, or to conduct a transaction with another device such as a wireless mobile device or a stationary wireless device by physically bumping or tapping the wireless mobile device into the second device. This bump or tap may be sensed by, for example, sensors in one or both devices. The devices may then transfer data or conduct a transaction between them.

However, it may not be desirable to have to physically tap or bump the wireless mobile device into the other device to initiate the data transfer, or the transaction.

SUMMARY OF THE EMBODIMENTS

Various embodiments of a method for detecting the proximity of a signal source using wireless systems are disclosed. Broadly speaking, a method is contemplated in which a wireless mobile device wirelessly receives packets from a signal source and determines a received signal strength for each packet. The wireless mobile device may store information based upon the received signal strength for each packet, and calculate from the information stored for all the packets, a current path loss value corresponding to a current distance from the wireless mobile device to the signal source. The wireless mobile device may then determine whether the current distance is sufficient to be an enabling condition such as tap, for example, for a data transfer or a transaction between the wireless mobile device and the signal source.

Figure 1:
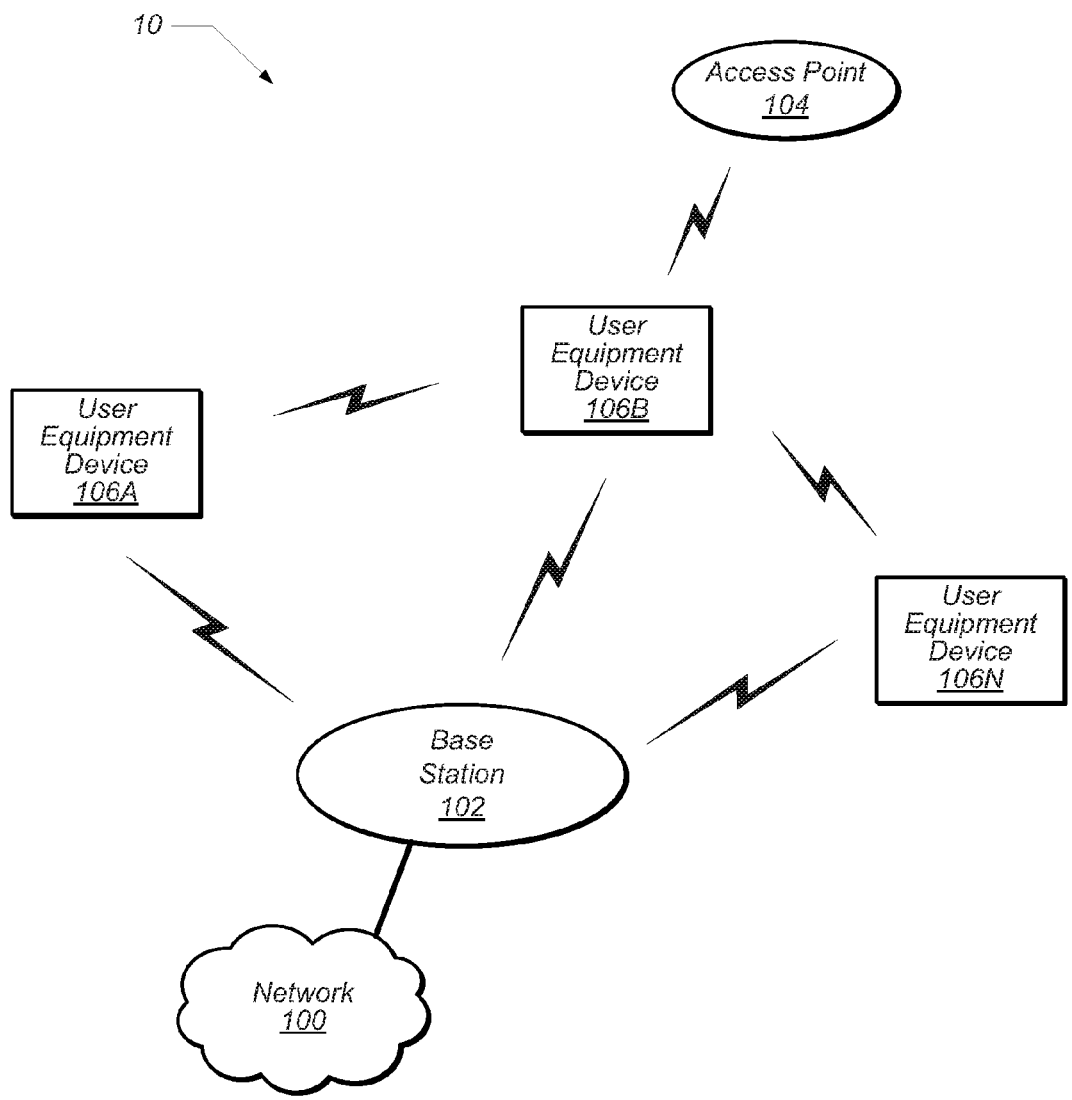
FIG. 1 is a block diagram of one embodiment of a wireless communication system.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

As mentioned above, some wireless mobile devices may have the capability to physically tap or bump another wireless mobile device or a stationary wireless device to initiate (i.e., tap event) an exchange of data such as a monetary transaction or data transfer, for example. In some scenarios these devices typically include accelerometers or other sensors that detect the bump, and can then initiate a security or handshake between the devices. In other scenarios, a wireless mobile device may send out a signal and when the wireless mobile device is close enough to a passive non-powered device, the electromagnetic field created by the wireless mobile device signal may power up the non-powered device through magnetic coupling. These types of proximity taps are typically restricted to a few centimeters.

As described in the following embodiments of FIG. 1 through FIG. 4, various embodiments are disclosed in which a wireless mobile device may be able to determine its distance from another device that is emitting a particular signal, whether stationary or mobile, and to determine whether that distance is close enough to enable a data transfer or some other type of transaction with the other device (i.e., to be considered a tap event).

Turning now to FIG. 1, a block diagram of one embodiment of a wireless communication system is shown. It is noted that the system of FIG. 1 is merely one example of any of a variety of wireless communication systems. The wireless communication system 10 includes a base station 102 which communicates over a wireless transmission medium (as indicated by the zig-zag) with one or more user equipment (UE) devices (e.g., 106A through 106N). The base station 102 is also coupled a network 100 via another interface, which may be wired or wireless. Each of the UE devices 106A through 106N are also coupled to each other UE device 106A through 106N via a wireless transmission medium. Lastly, as shown, UE device 106B is coupled via the wireless transmission medium to a wireless access point 104. It is noted that components identified by reference designators that include both a number and a letter may be referred to by the number only where appropriate.

The base station 102 may be a base transceiver station (BTS) or cell site, and may include hardware that enables wireless communication with one or more of the UEs 106. The base station 102 may also be equipped to communicate with the network 100. Thus, the base station 102 may facilitate communication between the UEs 106 and/or between the UEs 106 and the network 100. The communication area (or coverage area) of the base station 102 may be referred to as a "cell." In various embodiments, the base station 102, the UEs 106, and the wireless access point 104 may be configured to communicate over the transmission medium using any of various wireless communication radio access technologies such as LTE, GSM, CDMA, WLL, WAN, WiFi, WiMAX, Bluetooth, Bluetooth LE, and others for example.

In one embodiment, each of the UEs 106A-106N may be representative of a wireless mobile device with wireless network connectivity such as a mobile phone, a hand-held device, a computer or a tablet, or virtually any type of wireless device. As described further below, the UE 106 may include at least one processor (shown in FIG. 3) that is configured to execute program instructions stored in a memory (also shown in FIG. 3). Accordingly, in some embodiments, the UE 106 may perform one or more portions of the functionality described below by executing such stored instructions. However, in other embodiments, the UE 106 may include one or more hardware elements and/or one or more programmable hardware elements such as an FPGA (field-programmable gate array) that may be configured to perform the one or more portions the functionality described below. In still other embodiments, any combination of hardware and software may be implemented to perform the functionality described below.

In one embodiment, the wireless access point 104 may be representative of a stationary or mobile point of sale terminal that is wirelessly transmitting packets at some predetermined interval. For example, a cash register at a retail business may include a wireless transceiver for conducting wireless transactions. In another embodiment, the wireless access point 104 may be representative of a stationary or mobile access point such as a wireless router, for example, that is wirelessly transmitting packets at some predetermined interval and which provides access to a computer network, and or the Internet. In various other embodiments, the wireless access point 104 may generally provide access between the UE 106 and any of a variety of computer and/or cellular network functions.

As described further below in conjunction with the descriptions of FIG. 2 through FIG. 4, in some embodiments, the UE 106 may be configured to wirelessly receive packets from a signal source such as another UE 106, or the wireless access point 104, for example. The UE 106 may also determine the distance to the signal source, and determine whether that distance is sufficient to enable an exchange of data with the signal source (i.e., the device transmitting the packets).

Figure 2:
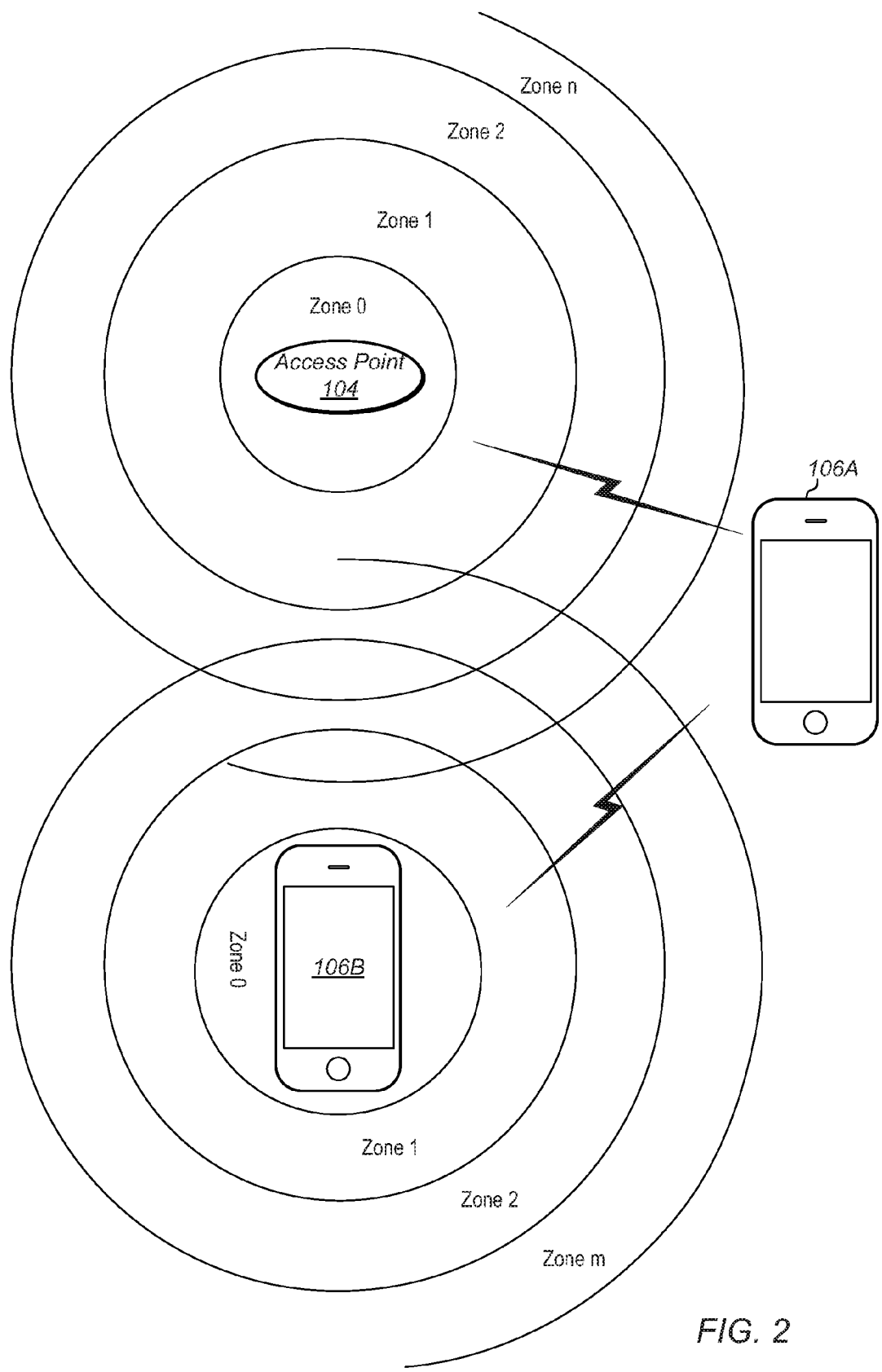
FIG. 2 is a diagram of one embodiment of proximity zones between a signal source and a wireless mobile device.

Turning to FIG. 2, a diagram of illustrating one embodiment of proximity zones between a user equipment device and another wireless device is shown. As shown, UE 106A is some distance away from the wireless access point 104 and the UE 106B. As indicated by the circles, the distance from the wireless access point 104 and the UE 106B is delineated into zones. More particularly, zone 0 corresponds to a first radius, zone 1 corresponds to a second radius, zone 2 corresponds to a third radius, and zones n and m correspond to respective fourth radii, where n and m may be any whole number, and where zone 0 is closer than zone n or m. As the UE 106A gets closer to the wireless access point 104, the UE 106A enters zone n of the wireless access point 104 and if the UE 106A continues to move closer, it will transition from zone n to zone 2 to zone 1, and finally to zone 0. In a similar way, as the UE 106A moves closer to UE 106B it will enter zone m and transition to zones 2, 1, and 0.

In one embodiment, each zone may correspond to a different distance for each device. For example, depending on the type of device and particular application, a given device may have zones that correspond to one set of distances, and another device may have zones that correspond to a different set of distances. In addition, as mentioned above each wireless access point 104 may provide a different service.

In various embodiments, the wireless access point 104 may broadcast packets at a predetermined interval. In one particular embodiment, the wireless access point 104 and the UE 106B may broadcast the packets using the Bluetooth LE protocol. As such, the packets may be encoded as advertising packets. The advertising packets may include the address of the transmitting device, information corresponding to connectivity capability, a universal unique identifier (UUID) that identifies the device as "tappable," and the transmit power at which the packet was transmitted, among others. However, it is contemplated in other embodiments the packets may be broadcast with a different encoding, and they may be broadcast using any type of wireless communication standard. In various embodiments, the wireless access point 104 may act as a server, and the UE 106A may act as a client in a client-server arrangement.

In one embodiment, when the UE 106A begins receiving these advertising packets, UE 106A may begin determining the distance to the wireless access point 104 based upon the received signal strength indication (RSSI) of the packets. In addition, the UE 106A may determine whether the distance is sufficient to enable a transaction or data transfer between the UE 106A and the wireless access point 104. In one embodiment, once the determination is made, application software running on the UE 106A may determine whether to automatically and without user intervention begin the transaction or transfer, or whether user intervention may be needed.

In another embodiment, the UE 106B may act as a server. More particularly, in such an embodiment, the UE 106B may broadcast packets in a way similar to the wireless access point 104. However, the packet broadcast may, in one embodiment, not be continuous, but rather when prompted by particular application software, or when activated by user interaction with a software application. In either case, if the UE 106B begins broadcasting the advertising packets, when the UE 106A begins receiving these advertising packets, UE 106A may begin determining the distance to the UE 106B based upon the received signal strength (RSSI) of the packets. In addition, the UE 106A may determine whether the distance is sufficient to enable a transaction or data transfer between the UE 106A and the UE 106B.

As described in greater detail below in conjunction with the descriptions of FIG. 3 and FIG. 4, in various embodiments, the UE 106A may include a proximity unit that may include hardware, software, or a combination that may be used by one or more applications running on the UE 106A to determine the distance to a signal source, and to determine based upon some predetermined parameters whether the distance corresponds to an enabling condition (i.e., a tap event) for an exchange of data between the UE 106A and the UE 106B.

Figure 3:
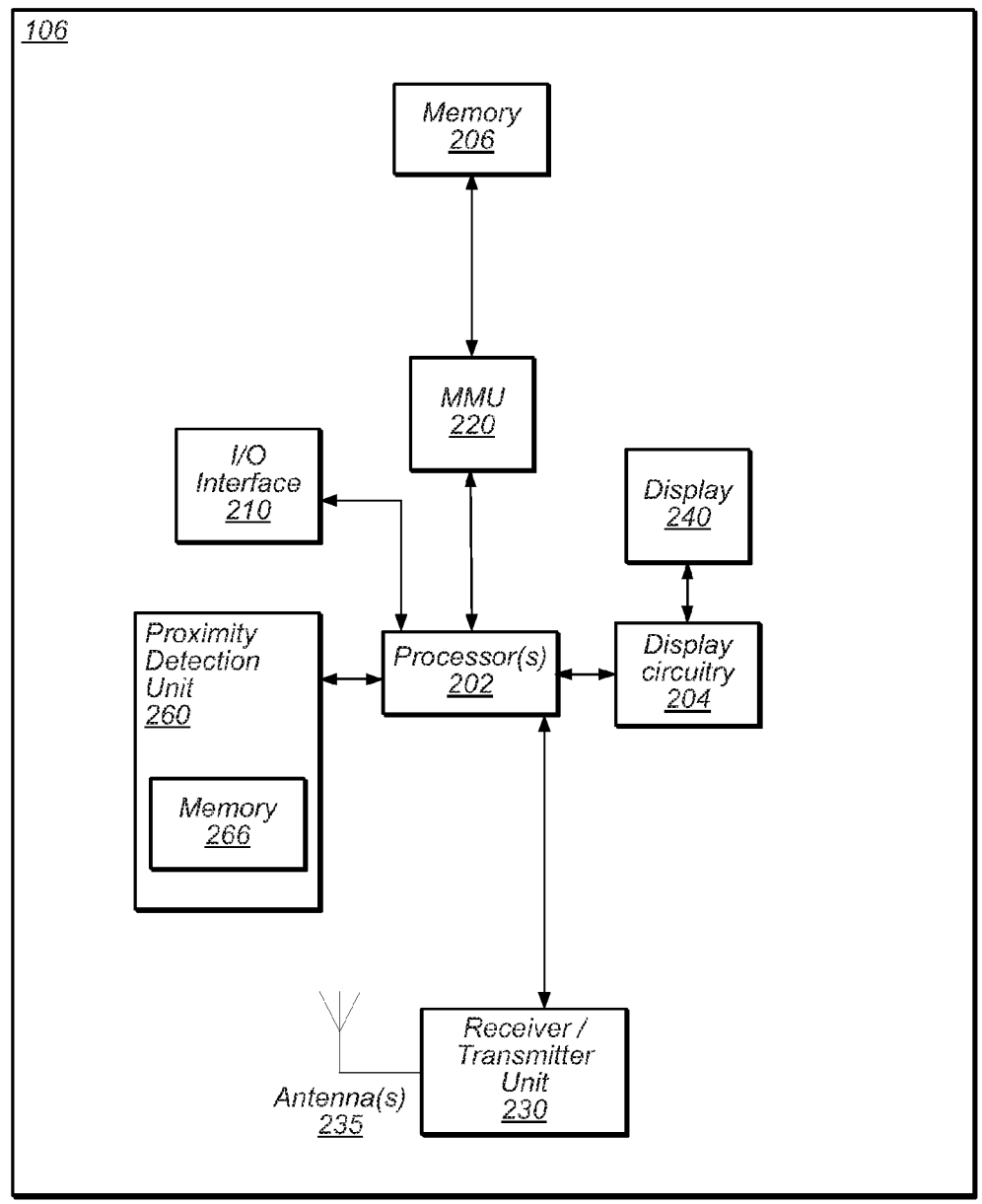
FIG. 3 is a block diagram of one embodiment of a wireless mobile device shown in FIG. 1.

Referring to FIG. 3, a block diagram of one embodiment of a user equipment device of FIG. 1 is shown. It is noted that components that correspond to components shown in FIG. 1 are numbered identically for clarity and simplicity. The UE 106 includes processor(s) 202 (or processor core(s) 202) which is coupled to display circuitry 204 which is in turn coupled to the display 240. The processor(s) 202 is also coupled to a memory management unit (MMU) 220, which is coupled to a memory 206. The processor(s) 202 is also coupled to a receiver/transmitter (R/T) unit 230, and to a proximity detection unit 260. The UE 106 also includes an I/O interface 210 that is coupled to the processor(s) 202, and may be used for coupling the UE 106 to a computer system, or other external device. It is noted that in one embodiment the components shown within UE 106 of FIG. 2 may be manufactured as stand alone components. However, it is contemplated that in other embodiments various ones of the components may be part of one or more chipsets, or they may be part of a system on chip (SOC) implementation.

In various embodiments, the processors 202 may be representative of a number of different types of processors that may be found in a wireless communications device. For example, processor(s) 202 may include general processing capability, digital signal processing capability, as well as hardware accelerator functionality, as desired. The processor(s) 202 may include baseband processing and therefore may digitally process the signals received by the R/T unit 230. The processor(s) 202 may also process data that may be transmitted by the R/T unit 230. The processor(s) 202 may also perform a number of other data processing function such as running operating system and user applications for the UE 106.

In one embodiment, the MMU 220 may be configured to receive addresses from the processor(s) 202 and to translate those addresses to locations in memory (e.g., memory 206) and/or to other circuits or devices, such as the display circuitry 204, R/T unit 230, and/or display 240. The MMU 220 may also return data to the processor(s) 202 from the locations in memory 206. The MMU 220 may be configured to perform memory protection and page table translation or set up. In some embodiments, the MMU 220 may be included as a portion of the processor(s) 202. The display circuit 204 may be configured to perform graphics processing and provide display signals to the display 240.

The R/T unit 230 may, in one embodiment, include analog radio frequency (RF) circuitry for receiving and transmitting RF signals via the antenna 235 to perform the wireless communication. The R/T unit 230 may also include down-conversion circuitry to lower the incoming RF signals to the baseband or intermediate frequency (IF) as desired. For example, the R/T unit 230 may include various RF and IF filters, local oscillators, mixers, and the like. Since the UE 106 may operate according to a number of radio access technologies, the R/T unit 230 may include a corresponding number of RF front end portions to receive and down-convert, as well as up-convert and transmit the respective RF signals of each technology. For example, in one specific implementation, the R/T unit 230 may include an LTE front end and an IS-2000 front end.

In various embodiments, the processor(s) 202 may execute software stored within a memory such as memory 206 and memory 266, for example, to perform functionality associated with determining the distance to a signal source, and determining whether the distance corresponds to a tap event as mentioned above, and described further below. Accordingly, memory 206 and memory 266 may be representative of any type of non-transitory computer readable storage medium or device such as any device in the random access memory (RAM) family of devices, for example. Additionally, the software instructions may be stored on a portable/removable storage media and transferred to memory 206 and/or memory 266. In other embodiments however, the UE 106 may include hardware associated with the processor(s) 202 and/or the R/T 230 to perform functionality associated with determining the distance to a signal source, and determining whether the distance corresponds to a tap event as mentioned above. In still other embodiments, the UE 106 may include any suitable combination of hardware, firmware and/or software to perform functionality associated with the tune-away mode as mentioned above, and described further below in conjunction with the description of FIG. 4.

In one embodiment, the proximity unit 260 may be configured to store packets received from a signal source such as a wireless access point 104 or another UE 106. The proximity unit 260 may use the RSSI values to calculate a current path loss value from a number of RSSI values. In one embodiment, the proximity unit 260 may calculate a path loss value from an average of a number of RSSI values. The path loss value may be calculated as the difference between the transmitted power of the packets and the received power of the packets as measured by the proximity unit 260. The path loss value corresponds to the distance from the UE 106 to the signal source because generally the greater the distance, the greater the path loss will be. Thus, in one embodiment, lower path loss values correspond to shorter distances. As mentioned above, in one embodiment, the packet may include a value corresponding to the transmitted power of the packet. In another embodiment, the transmitted power of the packet may already be known, based upon the type of device broadcasting the packets. In such cases, the device type may be included in the packets.

The proximity unit 260 may store enough packets to reliably calculate stable RSSI values and corresponding path loss values. However, because RSSI measurements and calculations can be less reliable as distance from the signal source increases, the proximity unit 260 may be configured to gather (sample) more packets the farther away the UE 106 is from the signal source (and thus the higher the zone), and to sample fewer packets as the UE 106 gets closer to the signal source. In one embodiment, more samples may be gathered when the UE 106 is in higher zones because, as described further below, there may be many outlier values, and many of the high and low RSSI outlier values may be discarded. This active filtering occurs dynamically and automatically during operation. Accordingly, the proximity unit 260 may initialize as being in the farthest zone, and thus sample and store a larger number of packets, and then compare to values associated with lower zones. Each zone may correspond to a maximum and a minimum path loss value, thereby creating a path loss value range. If the current path loss value falls outside the range for a given zone, the proximity unit 260 compares the current path loss value to the range of the next adjacent zone. This continues until the current path loss value either falls within the range of a particular zone or the current path loss value falls below the minimum value of the lowest (i.e., closest zone). The selection of the next adjacent zone is determined by whether the current path loss value is higher than the maximum value or lower than the minimum value.

In one embodiment, the proximity unit 260 may receive information from an application executing on processor 202. More particularly, in one embodiment, the determination of whether a particular distance corresponds to a tap event may be dependent on the type of application that is running. For example, a user may not want to initiate a payment terminal transaction 25 feet away from the terminal, but may allow a payment transaction from two feet. Thus, the application software may provide specific parameters such as the tap event distance, or the corresponding zone to the proximity unit 260, to allow the proximity unit 260 to make the determination. However, in other embodiments, the proximity unit 260 may provide the current distance and/or the corresponding zone to the application software to enable the application software to make the final tap even determination.

In addition, in one embodiment, to prevent an inadvertent second tap event once a tap event has been detected, the proximity unit 260 may be configured to determine whether the zone has increased from the zone that UE 106 was in when the last tap event was detected. Otherwise the proximity unit 260 may not re-arm for another tap event. In other words, in one embodiment, to detect a subsequent tap event the proximity unit 260 must detect that the UE 106 moved away from the signal source far enough to be in the next higher zone, before moving back into the zone in which tap event would be detected.

It is noted that in one embodiment, the UE 106 may be configured to continuously monitor for the advertising packets and thereby act as a client device. However, in other embodiments, the UE 106 may be configured to monitor for the advertising packets in response to instructions from application software executing on processor(s) 202.

It is further noted that the UE 106 may also operate as the server device, as described above in reference to the operation of UE 106B in the description of FIG. 2. Accordingly, the UE 106 may be configured to send packets such as the advertising packets, for example. In one embodiment, the UE 106 may begin sending the packets in response to execution of particular application software executing on the processor(s) 202. Alternatively, the UE 106 may begin sending the packets in response to another type of trigger.

Figure 4:
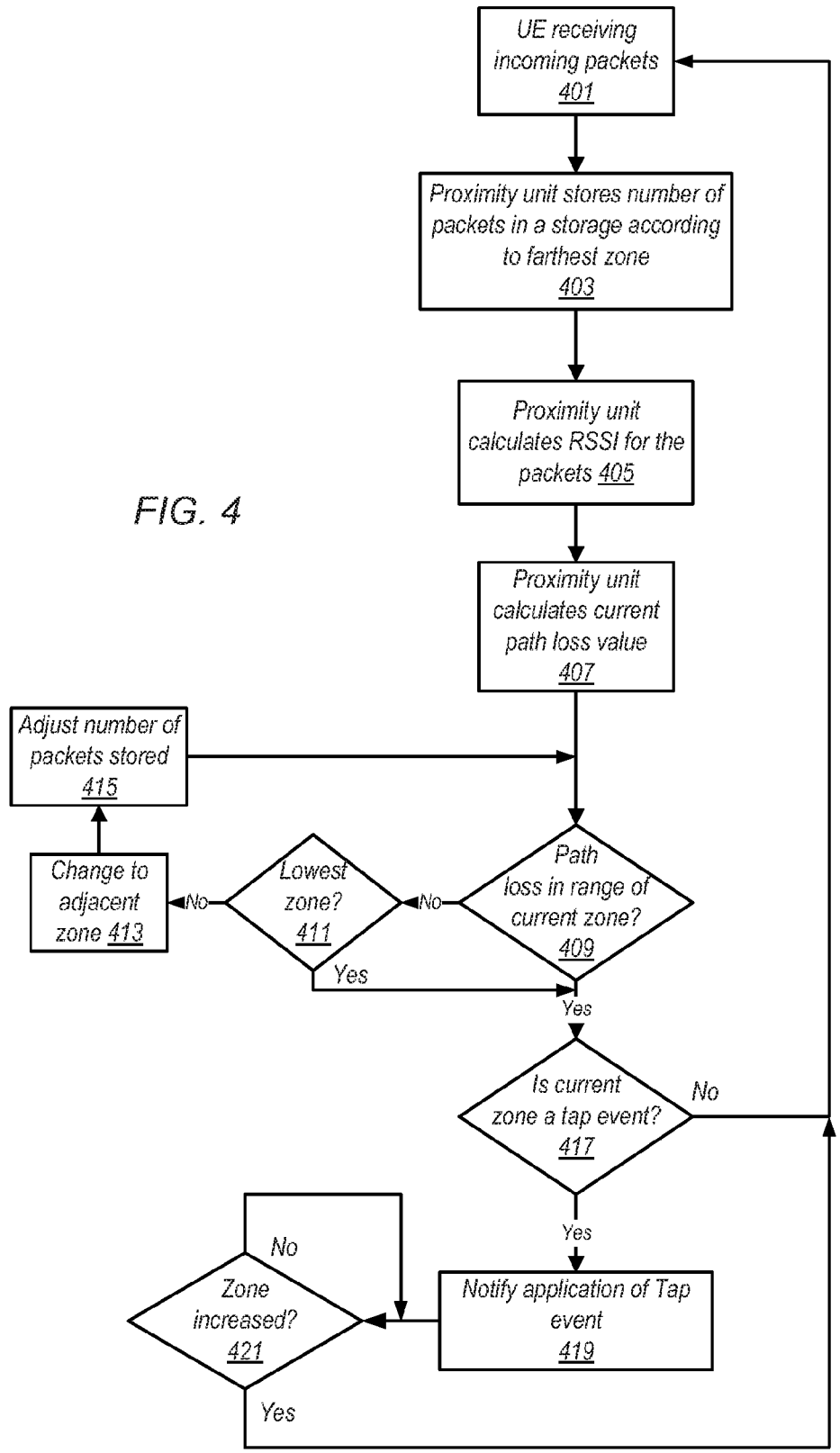
FIG. 4 is a flow diagram depicting the operation of one embodiment of the wireless mobile device shown in FIG. 3.

In FIG. 4, a flow diagram depicting the operation of one embodiment of the wireless user equipment device of FIG. 1 through FIG. 3 is shown. Referring collectively to FIG. 1 through FIG. 4 and beginning in block 401 of FIG. 4, the UE 106 may be receiving packets from a signal source such as a wireless access point (e.g., 104) or another wireless device such as another UE. The proximity unit 260 may store the incoming packets in a storage such as memory 266, or memory 206, as desired (block 403). As described above, the number of packets may correspond to the zone within which the UE determines that it is currently within. Upon first receiving the packets, the proximity unit 260 may start in the farthest zone.

The proximity unit 260 may calculate RSSI values from the packets in the storage (block 405). From the RSSI values and the transmitted power values of the stored packets, the proximity unit 260 may calculate a current path loss value, which may be the difference between the received signal strength and the transmitted signal strength. This current path loss value corresponds to the current distance that the UE is away from the signal source (block 407). In one embodiment, the proximity unit 260 may discard some number of the highest and lowest RSSI values, and average the remaining RSSI values. In one embodiment the average may be a straight average. In another embodiment, the average may be a weighted average, with more weight being given to more recent values. The number of discarded values may depend upon the current zone, with more values being discarded in farther zones. More particularly, as the distance between the signal source and the UE increases, there may be more opportunities for multipath artifacts, which may present themselves abnormally weak signals. In addition, abnormally high strength signals for a given zone may also be present due, for example, to alternative signal paths. In various embodiments the proximity unit 260 may compare the RSSI values to a pair of per-zone threshold values, one high and one low for each zone. The per-zone threshold values may be determined using any of a variety of statistical methods, for example.

The proximity unit 260 may then compare the current path loss value to the maximum and minimum values that make up the range for the current zone. If the current path loss value is not within the range of the current zone (block 409), the proximity unit 260 may check to determine if the current zone is the lowest zone (block 411). If it is not the lowest (i.e., closest zone), the proximity unit 260 starts comparing the current value to the next lower adjacent zone range (block 413). In addition, the proximity unit 260 may continue to receive packets and calculate the current path loss values concurrent with the comparison with the various zone ranges. Further, as the UE moves closer to the signal source from zone to zone, and the proximity unit 260 compares the current path loss values in lower zones, the proximity unit 260 uses fewer packets to calculate the current path loss value (block 415). If the current path loss value is still not in the range of the next adjacent zone, the proximity unit 260 continues changing to the next lowest zone (block 413), checking until the current value is either being compared to the lowest zone (block 411), or the value falls within the range of the current zone. Once the current path loss value falls in the range of the current zone (block 409), the proximity unit 260 may determine if the current range corresponds to a tap event (block 417). In one embodiment, the proximity unit 260 may compare the distance that corresponds to current zone with one or more predetermined parameters such as the distance from the signal source. As mentioned above the parameters may be provided by application software executing on the processor(s) 202.

If the proximity unit 260 determines that the current zone does not qualify as a tap event, operation proceeds as described above in conjunction with the description of block 401. However, referring back to block 417, if the proximity unit 260 determines that the current zone does qualify as a tap event, the proximity unit 260 may notify the application software of the tap event (block 419).

As mentioned above, once a tap event has been detected, the proximity unit 260 may reduce the occurrence of any subsequent inadvertent tap events. More particularly, in one embodiment, the proximity unit 260 will not re-arm proximity detection until it determines that the UE has moved away from the signal source by at least one zone (block 421). If the proximity unit 260 detects that the current path loss value falls within at least one next higher zone, then operation as described above in conjunction with the description of block 401.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless mobile device, comprising:
   a receiver/transmitter unit configured to wirelessly receive packets from a signal source; and
   a proximity unit configured to:
   determine a received signal strength corresponding to each of a plurality of the received packets;
   calculate, based at least in part on the determined received signal strength corresponding to each of the plurality of the received packets, a current distance of the wireless mobile device from the signal source, wherein calculating the current distance comprises determining a weighted average signal strength based on the plurality of the received packets, wherein a more recently received packet of the plurality of the received packets is assigned a higher weight than a less recently received packet;
   determine whether the current distance is within a threshold distance sufficient for enabling an exchange of data between the wireless mobile device and the signal source, wherein the threshold distance corresponds to physically introducing the wireless mobile device into proximity of the signal source; and
   enable an operation based at least in part on the current distance being within a predetermined range.

2. The wireless mobile device as recited in claim 1, wherein the packets from the signal source correspond to advertising packets and the signal source comprises a point of sale terminal.

3. The wireless mobile device as recited in claim 1, wherein the proximity unit is further configured to perform operations comprising initiating the operation without user input.

4. The wireless mobile device as recited in claim 1, wherein the proximity unit is configured to select, when the current distance is lower, fewer packets for the plurality of the received packets than when the current distance is higher.

5. The wireless mobile device as recited in claim 1, wherein the proximity unit is configured to exclude a packet of the received packets from use in calculating the current distance when a signal strength for the packet represents an outlier value.

6. The wireless mobile device as recited in claim 1, wherein the proximity unit is configured to providing a tap notification to an application based at least in part on the current distance being within the predetermined range.

7. The wireless mobile device as recited in claim 1, wherein the proximity unit is further configured to initiate monitoring for the packets responsive to receiving an instruction from an application executing on a processor of the wireless mobile device.

8. The wireless mobile device as recited in claim 1, wherein the proximity unit is configured to enable an operation that includes a transaction or an exchange of data with another device.

9. A method comprising:
   receiving signals via an antenna of a wireless mobile device, wherein the signals comprise packets transmitted from a signal source;
   generating, for received packets transmitted, an associated signal strength;
   determining a distance value representing a distance of the wireless mobile device from the signal source, based at least in part on the associated signal strength for each of a plurality of the received packets;
   determining to exclude a packet of the received packets from use in determining the distance value when the associated signal strength for the packet represents an outlier value; and
   enabling an operation based at least in part on the distance value being within a predetermined range.

10. The method as recited in claim 9, wherein the packets comprise advertising packets that include a transmit power value.

11. The method as recited in claim 9, further comprising proximity circuitry in the wireless mobile device initiating the operation without user input.

12. The method as recited in claim 9, wherein determining a distance value further comprises averaging the associated signal strength for each of the plurality of the received packets.

13. The method as recited in claim 12, wherein averaging the associated signal strength further comprises assigning a higher weight to the associated signal strength for a more recently received packet than the weight assigned to the associated signal strength for a less recently received packet of the plurality of the received packets.

14. The method as recited in claim 9, wherein generating the associated signal strength further comprises selecting, when the distance value is lower, fewer packets for the plurality of the received packets than when the distance value is higher.

15. The method as recited in claim 9 wherein enabling the operation further comprises providing a tap notification to an application.

16. The method as recited in claim 9, further comprising proximity circuitry in the wireless mobile device performing operations comprising generating advertising packets for transmission via an antenna of the wireless mobile device.

17. The method as recited in claim 9, wherein the operation comprises a transaction or an exchange of data with another device.

18. A non-transitory computer readable medium having instructions stored thereon that are executable by circuitry of a wireless mobile device to:
   determine a received signal strength corresponding to each of a plurality of packets wirelessly received, from a signal source, by a receiver/transmitter of the wireless mobile device;

calculate, based at least in part on the determined received signal strength corresponding to each of the plurality of the received packets, a current distance of the wireless mobile device from the signal source, wherein calculating the current distance comprises determining a weighted average signal strength based on the plurality of the received packets, wherein a more recently received packet of the plurality of the received packets is assigned a higher weight than a less recently received packet;

determine whether the current distance is within a threshold distance sufficient for enabling an exchange of data between the wireless mobile device and the signal source, wherein the threshold distance corresponds to physically introducing the wireless mobile device into proximity of the signal source; and enable an operation based at least in part on the current distance being within a predetermined range.

19. The computer readable medium as recited in claim 18, further comprising instructions executable by circuitry of the wireless mobile device to:

select, when the current distance is lower, fewer packets for the plurality of the received packets than when the current distance is higher; and exclude a packet of the received packets from use in calculating the current distance when a signal strength for the packet represents an outlier value.

20. The computer readable medium as recited in claim 18, further comprising instructions executable by circuitry of the wireless mobile device to provide a tap notification to an application based at least in part on the current distance being within the predetermined range.

* * * * *